Patented Aug. 18, 1936

2,051,389

UNITED STATES PATENT OFFICE

2,051,389

FULLING FABRICS

Joseph Nuesslein and Conrad Schoeller, Ludwigshafen-on-the-Rhine, Germany, assignors to I. G. Farbenindustrie Aktiengsellschaft, Frankfort-on-the-Main, Germany No Drawing. Application December 27, 1933, Serial No. 704,145. In Germany December 30, 1932

5 Claims. (Cl. 26—19)

The present invention relates to a new process of fulling fabrics.

We have found that fabrics which may be of animal or vegetable origin can be fulled in an advantageous manner by subjecting the said fabrics to a fulling treatment, while employing an aqueous bath containing a condensation product having free hydroxyl groups and derived from a polyhydric alcohol containing at least 4 hydroxyl groups and from a high molecular compound selected from the class consisting of the carboxylic acids and alcohols containing at least 6 carbon atoms in the molecule. The treatment of the fabrics with the aqueous bath containing the said condensation product may be effected before or during the treatment in the fulling-machine. The aforesaid polyhydric alcohols containing at least 4 hydroxyl groups comprise alcohols of the type of erythritol and sorbitol as well as polymerized alcohols of the type of polymerized glycerine such as di- or tri-glycerine. In the condensation products defined above the components are combined with one another in an ether-like or ester-like combination. The concentration of the aqueous baths may vary within wide limits, for example the condensation products may be present in amounts of between about 1 gram and 150 grams per litre, but higher amounts may be used, if desired. Usually the baths contain between about 2 and about 30 grams of the condensation product per litre. The said condensation products are suitable as additional materials in the preparation of fulled goods of all kinds. While using the said products the goods are better fulled than if they were fulled with the aid of the usual assistants in the textile industry such as soaps and soap-like compounds as for example Turkey red oils or acid sulphuric esters of alcohols of high molecular weight hitherto used for fulling. The fabrics fulled according to the present invention possess very valuable properties especially in that they are very dense and uniform. The ready made fabrics usually contain a certain amount of the condensation products.

Products suitable for use according to this invention are for example esters of high molecular fatty acids, as for example lauric, palmitic, stearic, oleic or ricinoleic acids, with polymerized glycerine, for example di-, or tri-glycerine, or sorbitol ether alcohols, and also the ether-like condensation products derived from fatty alcohols, such as those obtainable according to the British Patent No. 356,731 or by saponification of sperm oil, such as octyl, dodecyl, cetyl, oleyl alcohols or 7.18-stearylene glycol or cycloaliphatic alcohols, such as cyclohexanol, on the one hand and pentaerythritol, sorbitol, sugars on the other hand or the etherification products derived from the said polyhydric alcohols by the action of ethylene oxide. The said ester-like or ether-like products may be employed together with soaps or soap-like products, as for example condensation products of high molecular fatty acids and amino- or hydroxyalkyl-sulphonic acids or acid sulphuric esters of high molecular alcohols containing at least 12 carbon atoms or other sulphonic acids of aliphatic or aromatic substances, or the salts of the said sulphonic acids; such soap-like products can be obtained, for example, according to the Patents Nos. 1,932,176 and 1,932,179 and to the British Patents Nos. 306,116, 366,916, 367,585, 372,005, 337,737 and 337,774.

The said ester-like or ether-like products may also be employed together with other additional substances usually employed in fulling processes, as for example organic solvents, fuller's earth, or salts, as for example Glauber's salt, common salt, sodium phosphate or sulphuric acid. The fulling itself is effected in the usual manner. The regulation of the reaction of the fulling bath and the duration of the fulling may be arranged as desired depending on the nature of the goods to be treated. Preparations which contain the said ester-like or ether-like products together with other additional substances suitable for fulling such as soaps, tetrahydronaphthalene, ethylene glycol, cresyl or xylenyl ether or fuller's earth offer special advantages.

The following examples will further illustrate the nature of this invention but the invention is not restricted to these examples.

Example 1

Army cloth is fulled at about 20° C. for from 1 to 4 hours according to the desired fulling effect after wetting with about its own weight of a fulling bath containing, per litre of water about 20 grams of soap and 2 grams of a condensation product of oleic acid with a mixture of di- and tri-glycerine. A very good formation of felt is obtained even when employing comparatively poor quality cloth. At the same time, the fabric is well cleansed and acquires the property of being readily washed.

Example 2

Hair hats are fulled at from 30° to 40° C. for about 30 minutes in a fulling bath, which is neutral or acidified with sulphuric acid, and contains, per litre of water 5 grams of a product obtained by the condensation of 1 molecular proportion of the fatty acids from coconut oil with 1 molecular proportion of erythritol. A very full compact felt is obtained.

Example 3

Worsted piece goods which have been greased with olive oil are treated at about 35° C. in a washing machine which is filled with a bath containing, per litre of water, 5 grams of a condensation product of oleic acid with hydroxyethane sulphonic acid and 5 grams of the dodecyl ether of sorbitol hexahydroxyethyl ether. Even when employing hard water, the felting necessary for the preparation of heavy worsted goods is obtained.

Instead of the said condensation product of oleic acid and hydroxyethane sulphonic acid, condensation products of high molecular fatty acids or their derivatives, such as fatty acid chlorides and amino-alkyl sulphonic acids or sulphuric esters of high molecular alcohols or the salts of the said compounds may be employed. When a very strong fulling effect is desired, the addition of the said condensation products may be dispensed with.

Example 4

Half wool piece goods are treated for several hours at about 20° C. in a weakly alkaline bath in a cylinder fulling machine, the treatment liquid having been prepared by adding to each litre of water 20 grams of a product obtained by heating 635 parts of pure glycerine, 133 parts of tallow, 103 parts of coconut oil and 1.4 parts of 50 per cent caustic potash solution slowly to 300 C. A very good felting of the goods is obtained by the said treatment.

What we claim is:—

1. The process of producing a fulled fabric which comprises fulling such a fabric in the presence of an aqueous colloidal solution of a condensation product of a polyhydric alcohol containing at least 4 hydroxyl groups and a high molecular compound selected from the class consisting of the monobasic carboxylic acids and alcohols containing at least 6 carbon atoms in the molecule, said condensation product containing free hydroxyl groups.

2. The process of producing a fulled fabric which comprises fulling such a fabric in the presence of an aqueous colloidal solution comprising per liter between about 1 gram and 150 grams of a condensation product of a polyhydric alcohol containing at least 4 hydroxyl groups and a high molecular compound selected from the class consisting of the monobasic carboxylic acids and alcohols containing at least 6 carbon atoms in the molecule, said condensation product containing free hydroxyl groups.

3. The process of producing a fulled fabric which comprises fulling such a fabric in the presence of an aqueous colloidal solution comprising per litre between about 2 and 30 grams of a condensation product of a polyhydric alcohol containing at least 4 hydroxyl groups and a high molecular compound selected from the class consisting of the monobasic carboxylic acids and alcohols containing at least 6 carbon atoms in the molecule, said condensation product containing free hydroxyl groups.

4. The process of producing a fulled fabric which comprises fulling such a fabric in the presence of an aqueous colloidal solution of a condensation product of oleic acid and a mixture of di- and tri-glycerine, said condensation product containing free hydroxyl groups.

5. The process of producing a fulled fabric which comprises fulling such a fabric in the presence of an aqueous colloidal solution of a condensation product of 1 molecular portion of the fatty acids from cocoanut oil and 1 molecular portion of erythritol.

JOSEPH NUESSLEIN.
CONRAD SCHOELLER.